United States Patent [19]
Cassette

[11] Patent Number: 5,519,966
[45] Date of Patent: May 28, 1996

[54] GRAVESTONE FLOWER HOLDER

[76] Inventor: Carmen M. Cassette, 176 Buxton Rd., Saco, Me. 04072

[21] Appl. No.: 369,151

[22] Filed: Jan. 5, 1995

[51] Int. Cl.[6] .................................................. A01G 5/00
[52] U.S. Cl. .......................... 47/41.01; 47/33; 248/512
[58] Field of Search ......................... 47/33, 41.01, 41.1, 47/41.14, 95, 39 C; 24/580; 248/530, 512, 231

[56] References Cited

U.S. PATENT DOCUMENTS

| | | | |
|---|---|---|---|
| 160,247 | 2/1875 | Warren | 47/41.01 |
| 342,690 | 5/1886 | Flatau | 47/33 |
| 873,279 | 12/1907 | Weber-Illig | 47/41.01 |
| 1,009,533 | 11/1911 | Lacey | 24/580 |
| 2,258,112 | 10/1941 | Goeller | 47/41.01 |
| 2,639,878 | 5/1953 | Pierce | 47/41.14 |
| 3,056,969 | 10/1962 | Speros | 47/41.01 |
| 3,386,693 | 6/1968 | Ring | 47/41.01 |
| 3,477,181 | 11/1969 | Robison | 47/33 |
| 3,491,660 | 1/1970 | Kawasney | 47/33 |
| 5,020,760 | 6/1991 | Mayr | 248/231 |
| 5,090,397 | 2/1992 | Larsen | 248/231 |

FOREIGN PATENT DOCUMENTS

| | | | |
|---|---|---|---|
| 673955 | 11/1964 | Italy | 47/9 S |
| 8425 | of 1885 | United Kingdom | 47/41.01 |

*Primary Examiner*—Henry E. Raduazo

[57] ABSTRACT

A holder for supporting flowers proximal to a gravestone. The inventive device includes a main body having a plurality of apertures extending therethrough for receiving flower stems. A mounting assembly is coupled to the main body and extendable about the gravestone to mount the device thereto.

4 Claims, 4 Drawing Sheets

GRAVESTONE FLOWER HOLDER

BACKGROUND OF THE INVENTION

1. Field of the Invention

The present invention relates to holding devices and more particularly pertains to an gravestone flower holder for supporting flowers proximal to a gravestone.

2. Description of the Prior Art

The use of holding devices is known in the prior art. More specifically, holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art holding devices include U.S. Pat. No. 5,072,542; U.S. Pat. No. 4,722,160; U.S. Pat. No. 4,631,859; U.S. Pat. No. 4,21 7,729; and U.S. Pat. No. Des. 305,876.

While these devices fulfill their respective, particular objectives and requirements, the aforementioned patents do not disclose a gravestone flower holder for supporting flowers proximal to a gravestone which includes a main body having a plurality of apertures extending therethrough for receiving flower stems, and a mounting assembly coupled to the main body and extendable about a gravestone to mount the device relative thereto.

In these respects, the gravestone flower holder according to the present invention substantially departs from the conventional concepts and designs of the prior art, and in so doing provides an apparatus primarily developed for the purpose of supporting flowers proximal to a gravestone.

SUMMARY OF THE INVENTION

In view of the foregoing disadvantages inherent in the known types of holding devices now present in the prior art, the present invention provides a new gravestone flower holder construction wherein the same can be utilized for supporting flowers proximal to a gravestone. As such, the general purpose of the present invention, which will be described subsequently in greater detail, is to provide a new gravestone flower holder apparatus and method which has many of the advantages of the holding devices mentioned heretofore and many novel features that result in a gravestone flower holder which is not anticipated, rendered obvious, suggested, or even implied by any of the prior art holding devices, either alone or in any combination thereof.

To attain this, the present invention generally comprises a holder for supporting flowers proximal to a gravestone. The inventive device includes a main body having a plurality of apertures extending therethrough for receiving flower stems. A mounting assembly is coupled to the main body and extendable about the gravestone to mount the device thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gravestone flower holder apparatus and method which has many of the advantages of the holding devices mentioned heretofore and many novel features that result in a gravestone flower holder which is not anticipated, rendered obvious, suggested, or even implied by any of the prior art holding devices, either alone or in any combination thereof.

It is another object of the present invention to provide a new gravestone flower holder which may be easily and efficiently manufactured and marketed.

It is a further object of the present invention to provide a new gravestone flower holder which is of a durable and reliable construction.

An even further object of the present invention is to provide a new gravestone flower holder which is susceptible of a low cost of manufacture with regard to both materials and labor, and which accordingly is then susceptible of low prices of sale to the consuming public, thereby making such gravestone flower holders economically available to the buying public.

Still yet another object of the present invention is to provide a new gravestone flower holder which provides in the apparatuses and methods of the prior art some of the advantages thereof, while simultaneously overcoming some of the disadvantages normally associated therewith.

Still another object of the present invention is to provide a new gravestone flower holder for supporting flowers proximal to a gravestone.

Yet another object of the present invention is to provide a new gravestone flower holder which includes a main body having a plurality of apertures extending therethrough for receiving flower stems, and a mounting assembly coupled to the main body and extendable about a gravestone to mount the device relative thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
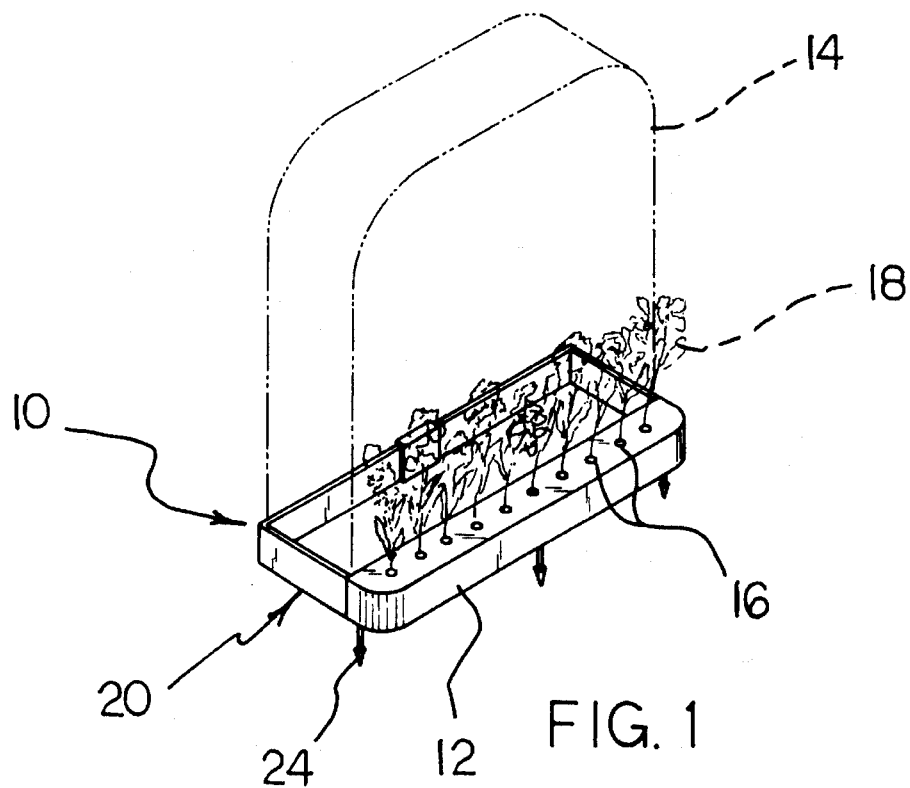
FIG. 1 is an isometric illustration of a gravestone flower holder according to the present invention in use.

With reference now to the drawings, and in particular to FIGS. 1–8 thereof, a new gravestone flower holder embodying the principles and concepts of the present invention and generally designated by the reference numeral 10 will be described.

More specifically, it will be noted that the gravestone flower holder 10 comprises a main body 12 positionable in front of a gravestone 14 within a cemetery or like area. The main body 12 includes a plurality of flower apertures 16 directed therethrough permitting insertion of the stems of flowers 18 through the main body for support of the flowers relative to the gravestone 14. A mounting means 20 is coupled to the main body 12 for securing the main body relative to the gravestone 14. By this structure, the flowers 18 can be supported in an organized fashion relative to a gravestone within a cemetery as desired.

The main body 12 is preferably substantially rectangular in shape and desirably includes a open lower end 22 (see FIG. 6) permitting insertion and growth of live flowers 18 through the flower apertures 16 and into soil positioned beneath the main body 12 during use as illustrated in FIG. 1. To further secure the main body 12 relative to the gravestone 14, a plurality of spikes 24 extend from the main body 12 for piercing insertion into the ground surface positioned therebeneath. By this structure, live or artificial flowers 18 can be inserted through the flower aperture 16 for support relative to the gravestone 14 as desired.

Figure 2:
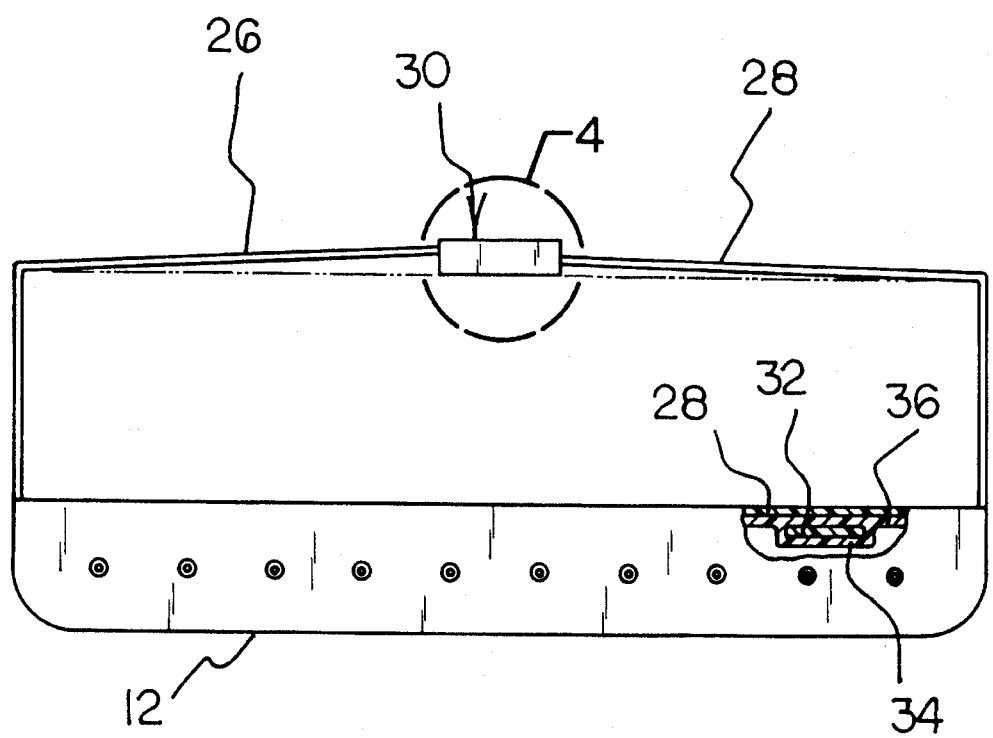
FIG. 2 is a top plan view of the invention in use.
Figure 3:
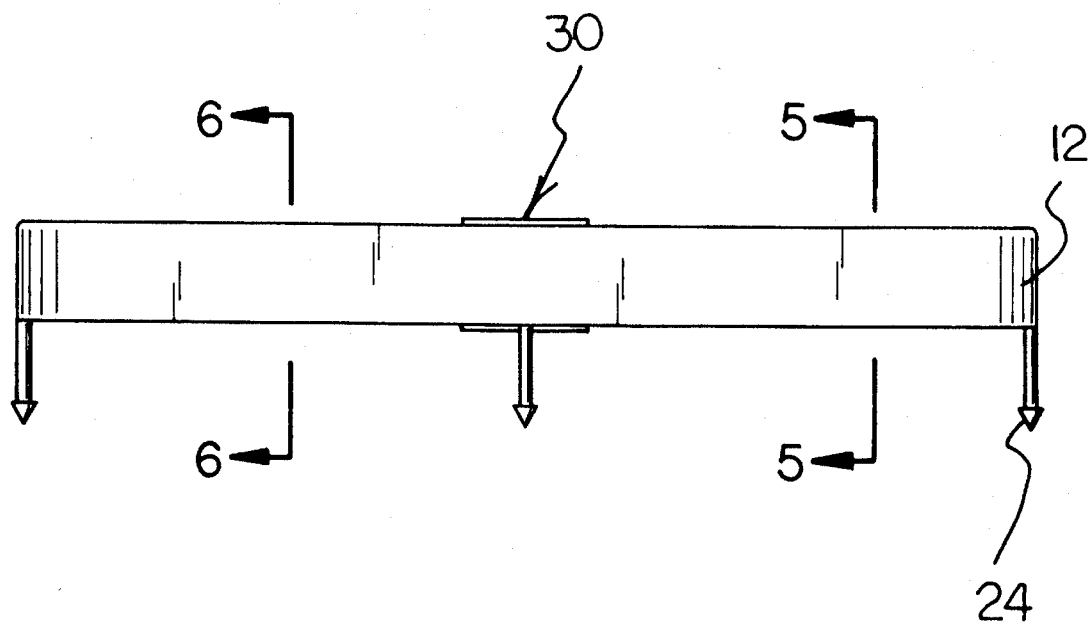
FIG. 3 is a front elevation view of the invention, per se.

As shown in FIG. 2, the mounting means 20 according to the present invention 10 preferably comprises a first strap 26 extending from a first side of the main body 12 and a second strap 28 extending from a second side of the main body 12. The straps 26 and 28 are operable to encompass a gravestone 14, with a coupling means 30 being provided with the invention 10 for removably coupling the distal ends of the straps 26 and 28 together about the gravestone 14. By this structure, the main body 12 can be further secured relative to the gravestone 14 in combination with the spikes 24, or alternatively, in lieu of the spikes 24.

Figure 5:
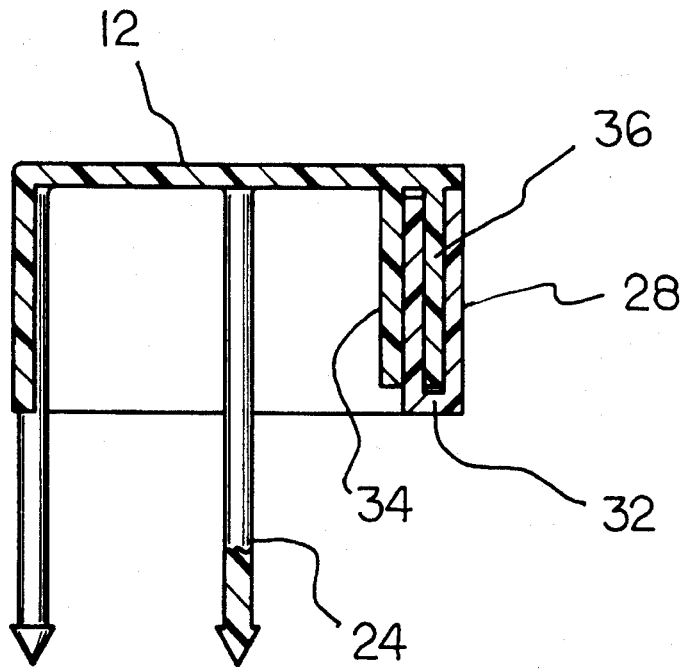
FIG. 5 is a cross sectional view taken along line 5—5 of FIG. 3.
Figure 6:
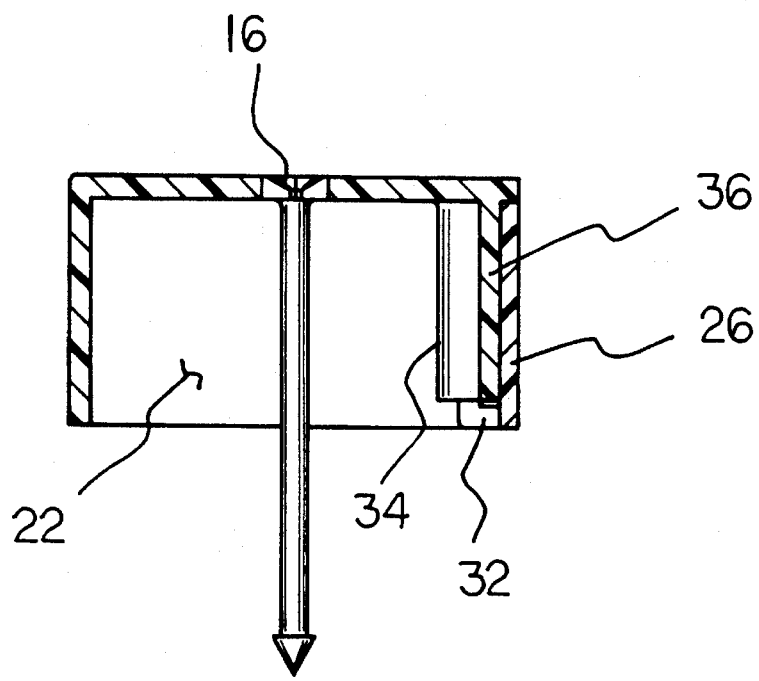
FIG. 6 is a cross sectional view taken along line 6—6 of FIG. 3.

As illustrated in FIGS. 2, 5, and 6, it can be shown that the first and second straps 26 and 28 are preferably contiguous in configuration and each include an upwardly projecting L-bracket 32 extending into a receiver 34 mounted to a rear wall 36 of the main body 12. The L-bracket 32, as shown for the second strap 28 within FIG. 5, is simply slidably positioned between the receiver 34 and the rear wall 36 so as to couple the strap 28 relative to the main body 12. By this structure, the main body 12 can be simply disconnected from the mounting means 20 through an upward lifting motion of the main body 12 along a front face of the gravestone 14.

Figure 4:
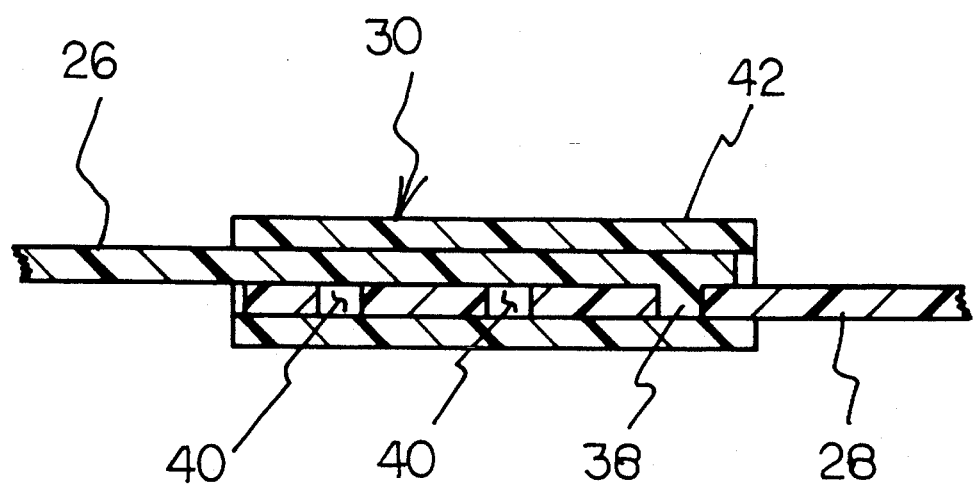
FIG. 4 is a cross sectional view of the area set forth in FIG. 2.
Figure 7:
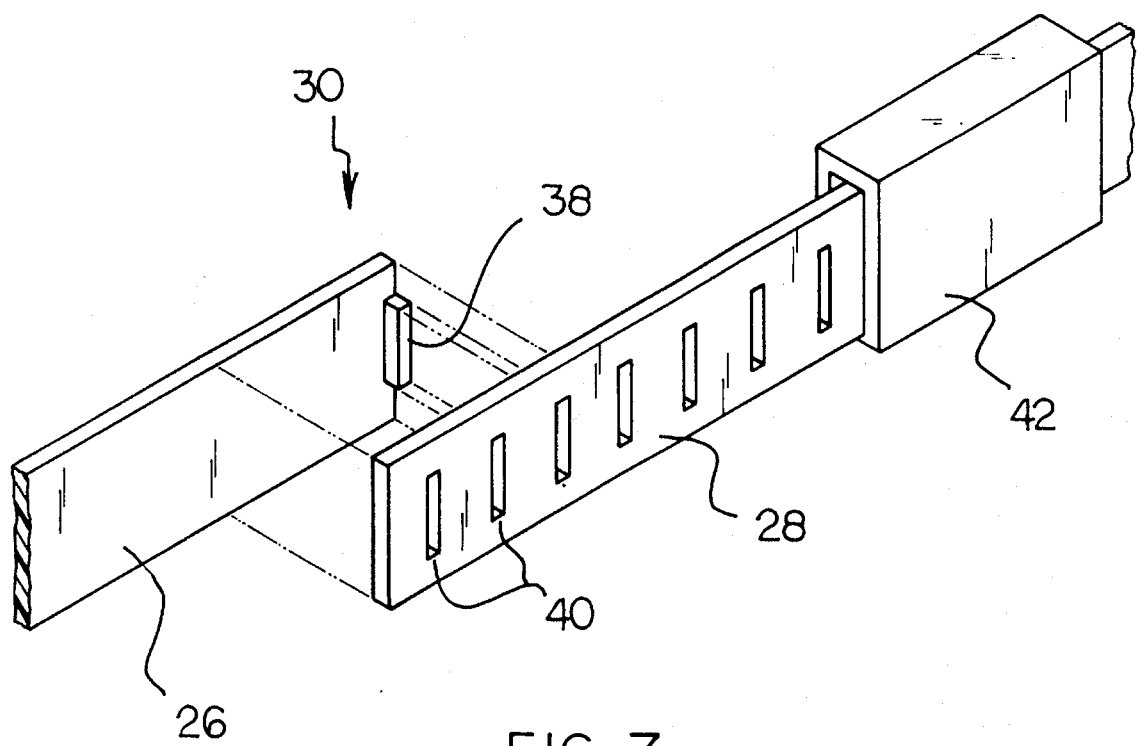
FIG. 7 is an exploded isometric illustration of a coupling comprising a portion of the present invention.

Referring now to FIGS. 4 and 7, it can be shown that the coupling means 30 of the mounting means 20 preferably comprises a projection 38 extending from the first strap 26 which is received within one of a plurality of adjustment apertures 40 formed in a spaced relationship along the second strap 28. A securing sleeve 42 is slidably positioned over the straps 26 and 28 to secure the projection 38 within an individual one of the adjustment apertures 40. By this structure, the coupling means 30 permits easy coupling and adjustment of the first strap 26 relative to the second strap 28.

Figure 8:
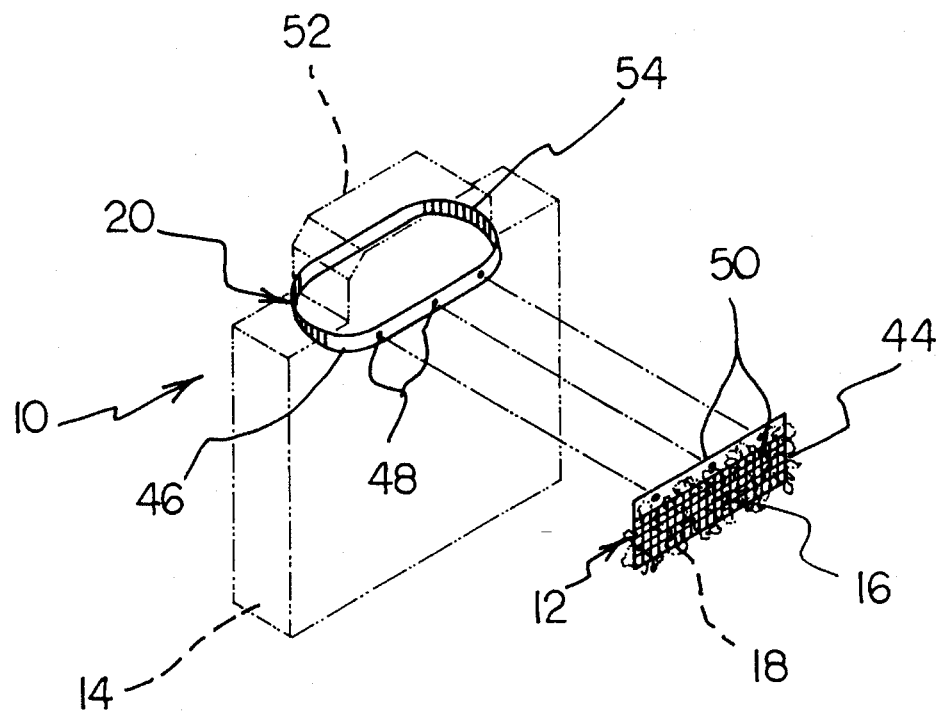
FIG. 8 is an exploded isometric illustration of an alternative form of the present invention in use.

Referring now to FIG. 8, wherein an alternative form of the present invention is illustrated in detail, it can be shown that the main body 12 may alternatively comprise a mesh screen member 44 having a plurality of flower apertures 16 directed therethrough for receiving the stems of flowers 18. The mounting means 20 of the alternative form of the invention comprises an elastic strap 46 having a plurality of mounting apertures 48 through which a plurality of mounting projections 50 of the main body 12 project to secure the mesh screen member 44 relative to the elastic strap 46. The elastic strap 46 of the alternative form of the mounting means 20 is positionable around an upper portion 52 of the gravestone 14 so as to secure the mesh screen member 44 relative thereto. The elastic strap 46 may include a plurality of transverse projections 54 extending in a substantially parallel and spaced orientation relative to one another which cooperate to enhance frictional engagement between the elastic strap and the upper portion 52 of the gravestone 14 to which it is attached, as shown in FIG. 8. By this structure, flowers 18 can be engaged to the mesh screen member 44 and suspended relative to the gravestone 14 as desired.

In use, the gravestone flower holder 10 according to the present invention can be easily utilized to suspend flowers 18 relative to a gravestone 14 within a cemetery to decorate such gravestone as desired by an individual. As stated above, live or artificial flowers, such as silk flowers or the like can be interchangeably positioned within the main body 12 as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A gravestone flower holder comprising:

a main body positionable in front of a gravestone, the main body including a plurality of flower apertures directed therethrough permitting insertion of a stem of a flower through the main body for support of the flower relative to the gravestone;

a mounting means coupled to the main body for securing the main body relative to the gravestone;

wherein the main body is substantially rectangular in shape and includes a open lower end permitting insertion and growth of a live flower through one of the flower apertures and into soil beneath the main body;

wherein the mounting means comprises a first strap extending from a first side of the main body; a second strap extending from a second side of the main body; and a coupling means for removably coupling distal ends of the straps together about a gravestone.

2. The gravestone flower holder of claim 1, wherein the first and second straps are contiguous with one another; and further comprising an upwardly projecting L-bracket extending from one of the straps; and a receiver mounted to a rear wall of the main body, the L-bracket being slidably positioned between the receiver and the rear wall so as to couple the strap relative to the main body.

3. The gravestone flower holder of claim 2, wherein the coupling means of the mounting means comprises a projection extending from the first strap which is received within one of a plurality of adjustment apertures formed in a spaced relationship along the second strap; and a securing sleeve slidably positioned over the straps to secure the projection within an individual one of the adjustment apertures.

4. The gravestone flower holder of claim 3, and further comprising a plurality of spikes extending from the main body for piercing insertion into a ground surface beneath the main body.

* * * * *